(12) United States Patent
Suzuki et al.

(10) Patent No.: US 8,616,579 B2
(45) Date of Patent: Dec. 31, 2013

(54) SIDE AIRBAG

(75) Inventors: Hiroyuki Suzuki, Okazaki (JP); Naoki Fujisawa, Okazaki (JP)

(73) Assignee: Mitsubishi Jodosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/496,450

(22) PCT Filed: Jan. 12, 2011

(86) PCT No.: PCT/JP2011/050379
§ 371 (c)(1),
(2), (4) Date: Mar. 15, 2012

(87) PCT Pub. No.: WO2011/087026
PCT Pub. Date: Jul. 21, 2011

(65) Prior Publication Data
US 2012/0175925 A1 Jul. 12, 2012

(30) Foreign Application Priority Data

Jan. 12, 2010 (JP) .................................. 2010-004388

(51) Int. Cl.
*B60R 21/216* (2011.01)
*B60R 21/207* (2006.01)
(52) U.S. Cl.
USPC ..................... 280/743.2; 280/729; 280/730.2; 297/216.1; 297/216.13
(58) Field of Classification Search
USPC ............. 280/728.1, 728.2, 729, 730.2, 743.2; 297/216.1, 216.13
See application file for complete search history.

(56) References Cited

U.S. PATENT DOCUMENTS

| | | | | |
|---|---|---|---|---|
| 5,890,732 | A * | 4/1999 | Nakamura et al. | 280/729 |
| 7,594,675 | B2 * | 9/2009 | Bostrom et al. | 280/730.2 |
| 7,766,379 | B2 * | 8/2010 | Dix et al. | 280/730.2 |
| 7,780,191 | B2 * | 8/2010 | Sato | 280/730.2 |
| 7,819,419 | B2 * | 10/2010 | Hayashi et al. | 280/730.1 |
| 7,837,226 | B2 * | 11/2010 | Honda et al. | 280/730.2 |
| 8,123,248 | B2 * | 2/2012 | Yamane | 280/739 |
| 8,246,076 | B2 * | 8/2012 | Schmidt et al. | 280/730.2 |
| 8,322,747 | B2 * | 12/2012 | Shankar | 280/729 |
| 8,360,466 | B2 * | 1/2013 | Kino et al. | 280/730.2 |
| 2006/0220359 | A1 * | 10/2006 | Sato | 280/730.2 |

(Continued)

FOREIGN PATENT DOCUMENTS

DE 10 2008 048 398 A1 2/2009
DE 10 2009 007 179 A1 7/2009

(Continued)

OTHER PUBLICATIONS

European Search Report dated Feb. 21, 2013.

*Primary Examiner* — Joseph Rocca
*Assistant Examiner* — Darlene P Condra
(74) *Attorney, Agent, or Firm* — Birch, Stewart, Kolasch & Birch, LLP

(57) ABSTRACT

A side airbag capable of fully absorbing impact directed to a chest region while keeping an arm from being pressed against the chest region due to inflation is provided. A side airbag 30, an arm facing section 38 which faces an arm H2 of the occupant H in an inflated state has a dented shape and serves to push up the arm H2 to a position where the arm H2 does not overlap a chest H3 region of the occupant.

9 Claims, 7 Drawing Sheets

(56) References Cited

U.S. PATENT DOCUMENTS

| | | | |
|---|---|---|---|
| 2007/0216142 A1 | 9/2007 | Honda et al. | |
| 2007/0228699 A1* | 10/2007 | Bederka et al. | 280/730.2 |
| 2007/0290488 A1* | 12/2007 | Taguchi et al. | 280/730.2 |
| 2008/0252054 A1 | 10/2008 | Kim et al. | |
| 2009/0206585 A1* | 8/2009 | Honda | 280/730.2 |
| 2011/0285119 A1* | 11/2011 | Yamamoto et al. | 280/743.2 |
| 2012/0235388 A1* | 9/2012 | Suzuki | 280/730.2 |

FOREIGN PATENT DOCUMENTS

| | | |
|---|---|---|
| JP | 9-86329 A | 3/1997 |
| JP | 2000-280853 A | 10/2000 |
| JP | 2005-119510 A | 5/2005 |
| JP | 2007-245879 A | 9/2007 |
| JP | 2008-1187 A | 1/2008 |
| JP | 2010-132072 A | 6/2010 |
| WO | 2012/009049 A1 | 1/2012 |

* cited by examiner

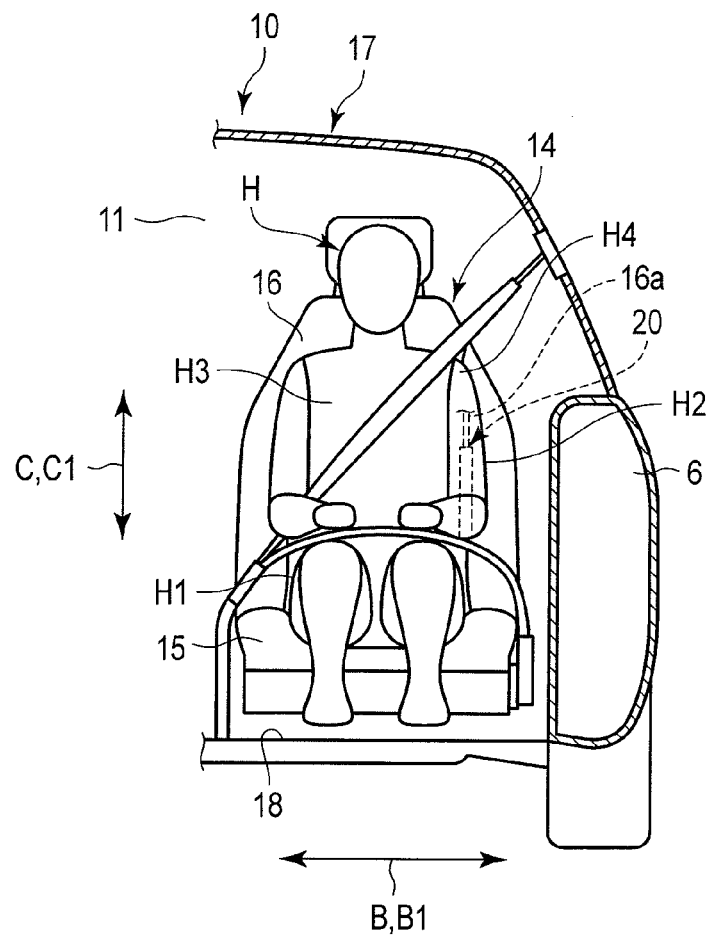
F I G. 2

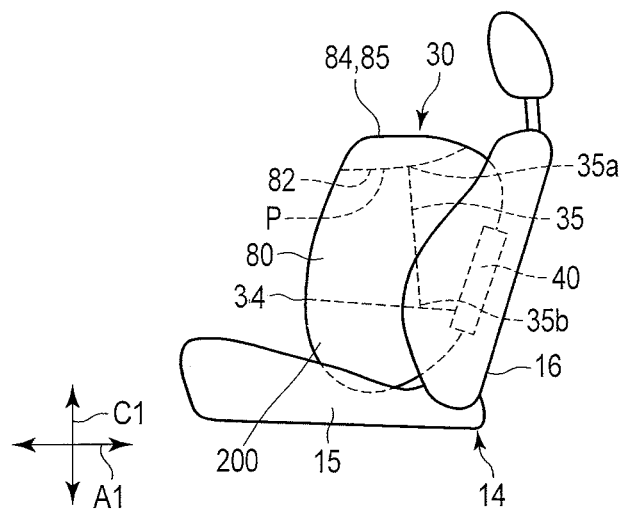
F I G. 8
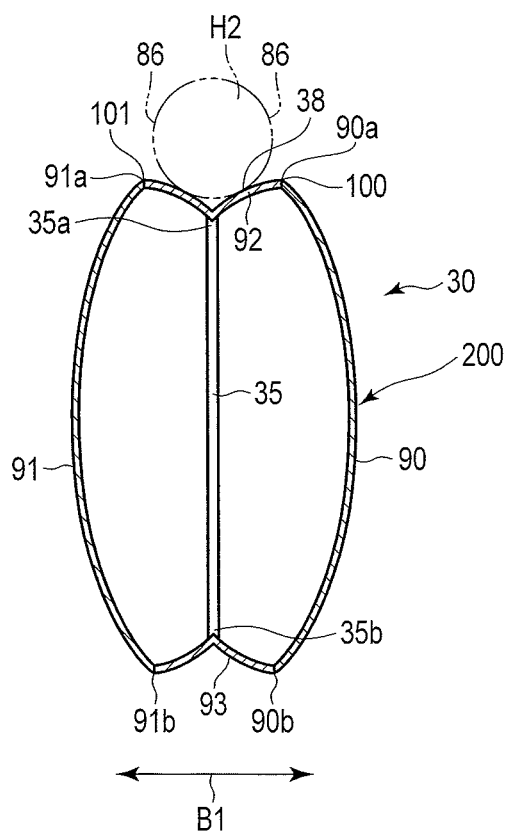
F I G. 9

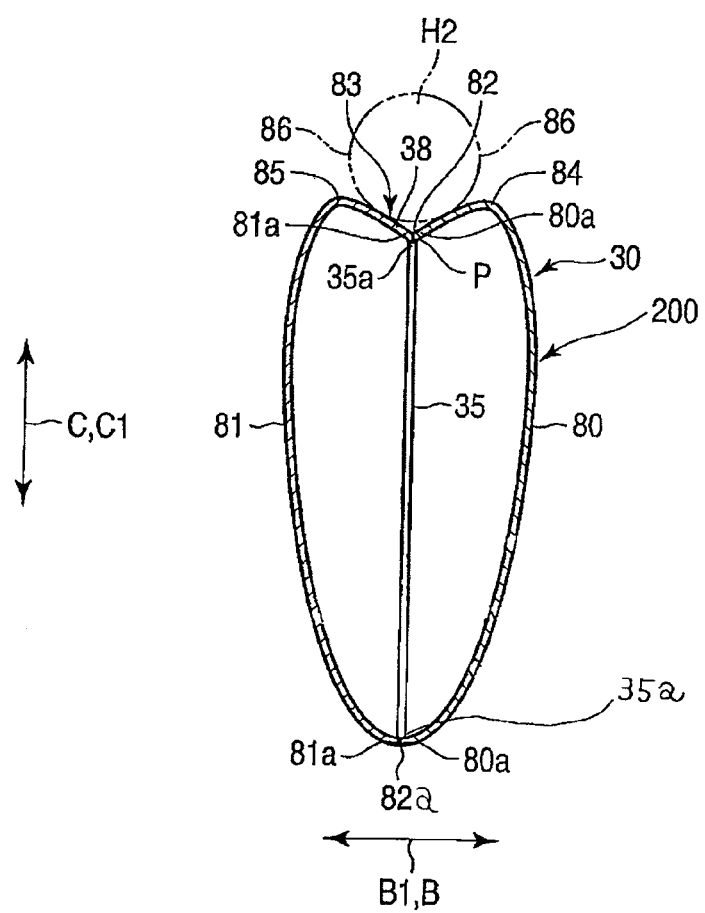
F I G. 10

SIDE AIRBAG

This is a U.S. National Phase application under 35 USC 371 of International Application PCT/JP2011/050379 (not published in English), filed Jan. 12, 2011.

TECHNICAL FIELD

The present invention relates to a side airbag configured to absorb impact applied laterally to, for example, a vehicle seat.

BACKGROUND ART

Conventionally, in a vehicle such as an automobile, a front seat, e.g., the driver's seat or passenger seat, is provided with a side airbag device for protecting an occupant from impact applied laterally relative to the body of the vehicle. The side airbag device comprises an igniter, inflator, side airbag, impact detection sensor, etc., and is secured to, for example, the frame of a seatback.

If impact is applied to, for example, a door member (an example of a lateral portion of the vehicle body) that closes a lateral door opening for the passenger seat, the impact detection sensor detects this impact. Then, the igniter is actuated so that gas is emitted from the inflator. The side airbag is inflated by a pressure of the gas emitted from the inflator.

The inflated side airbag projects outward from the seatback to be located between the occupant and door member. The side airbag is large enough to cover that region of the occupant which is oriented in the vehicle width direction. The region of the occupant which is oriented outward in the vehicle width direction mainly covers the range from the chest region to the lumbar region.

Since the side airbag is thus located between the occupant and the lateral portion of the vehicle body, impact applied laterally relative to the vehicle body can be absorbed by the inflated side airbag.

On the other hand, an arm of the occupant in the seat is normally located beside the chest region. In other words, the arm and chest region of the occupant are arranged side by side in the vehicle width direction. If the side airbag is inflated in this state, the arm of the occupant will be located between the inflated side airbag and the chest region of the occupant.

While the impact applied to the lateral portion of the vehicle body is absorbed as the side airbag is inflated, the side airbag subjected to the impact moves inward in the vehicle width direction. When this is done, the arm of the occupant is pressed against the chest region. If the arm is pressed against the chest region as the side airbag moves inward in the vehicle width direction, impact applied to the chest region of the occupant may sometimes increase.

In order to keep the arm from being pressed against the chest region due to deployment of the side airbag, therefore, a structure has been proposed in which a seam is provided at that part of the side airbag which faces the arm of the occupant, thereby suppressing inflation of that part of the side airbag which faces the arm. As the inflation of that part of the side airbag which faces the arm is suppressed, the arm can be kept from being pressed against the chest region (see Patent Document 1, for example).

In order to bind the occupant in a balanced way, a structure has been proposed in which a non-inflation portion is formed at that part of the side airbag which faces the arm of the occupant, and that part of the side airbag which corresponds to the shoulder of the occupant is inflated (see Patent Document 2, for example).

PRIOR ART DOCUMENT

Patent Document

Patent Document 1: Jpn. Pat. Appln. KOKAI Publication No. 2008-1187
Patent Document 2: Jpn. Pat. Appln. KOKAI Publication No. 2005-119510

DISCLOSURE OF INVENTION

Problem to be Solved by the Invention

In the techniques disclosed in Patent Documents 1 and 2, the thickness of that part of the side airbag which faces the arm in the vehicle width direction is so small that a space for the absorption of impact applied laterally relative to the vehicle body is small. Consequently, the impact may not be able to be fully absorbed.

An object of the present invention is to provide a side airbag capable of fully absorbing impact while keeping an arm from being pressed against the chest region due to inflation. Further, another object of the present invention is to provide a side airbag device comprising the side airbag.

Solution to Problem

A side airbag according to a first aspect of the present invention is configured to be deployed and inflated between a door of a vehicle and a vehicle occupant in a lateral direction of the vehicle. The side airbag includes an arm facing section. The arm facing section, provided at an upper end of the side air bag, rises upward as the side air bag inflates, and has a dented shape extending in a longitudinal direction of the vehicle and configured to accommodate an arm of a vehicle occupant. A tether extending between the arm facing section and a lower portion of the side air bag is a cord member, one end of which being connected to the arm facing section and an opposite end of which being connected to the lower portion of the side air bag at a position close to a rear of the side air bag in side view of the vehicle with respect to the one end.

In a side airbag according to a second aspect of the invention related to the first aspect of the invention, the arm facing section has such a shape as to be dented downward when the side airbag is deployed.

In a side airbag according to a third aspect of the invention related to the second aspect of the invention includes a base fabric, which forms the arm facing section, and a cord member pulls the base fabric inward, thereby bringing the base fabric into the dented shape, in the inflated state.

In a side airbag according to a fourth aspect of the invention related to the fourth aspect of the invention, the one end of the cord member is secured to the base fabric and the opposite end of the cord member is secured to the inside of an side airbag on a side opposite to the base fabric.

In a side airbag according a fifth aspect of to the invention related to one of the fourth aspect of the invention, includes a partition cloth which separates a space inside the airbag into at least an upper compartment, wherein the cord member is secured to the inside of the airbag as the opposite end is secured to the partition cloth.

In a side airbag according to an sixth aspect of the invention related to one of the fourth aspect of the invention, the arm facing section is located around a joint which connects two base fabrics, the cord member being secured to the joint.

A side airbag according to a seventh aspect of the invention is configured to be deployed and inflated between a door of a vehicle and a vehicle occupant in a lateral direction of the vehicle. The side airbag includes an arm facing section, provided at an upper end of the side air bag, that rises upward as the side air bag inflates. The arm facing section provided at an upper end of the side air bag, that rises upward as the side air bag inflates has a dented shape extending in a longitudinal direction of the vehicle and is configured to accommodate an arm of a vehicle occupant. The arm facing section is located around a joint which connects an occupant-side base fabric located on the occupant side and a vehicle-body-side base fabric located on the side of the lateral portion of the vehicle body. A tether extending between the arm facing section and a lower portion of the side air bag, is a cord member, one end of which being connected to the lower portion of the side air bag at a position close to a rear of the side air bag in side view of the vehicle with respect to the one end.

A side airbag according to an eighth aspect of the invention related to the seventh aspect, includes the one end of the cord member is secured to the joint and the opposite end of the cord member is to at least one of the inside of the occupant-side base fabric and the inside of the vehicle-body-side base fabric.

Effect of the Invention

According to the present invention, a space for the absorption of impact directed to the chest region of an occupant can be secured while keeping an arm from being pressed against the chest region due to deployment of a side airbag.

BRIEF DESCRIPTION OF DRAWINGS

FIG. 2 is a sectional view of the automobile taken along line F2-F2 shown in FIG. 1;
FIG. 8 is a side view showing the side airbag of FIG. 7 in the inflated and deployed state, taken from the outside with respect to the width direction;
FIG. 9 is a sectional view showing a side airbag according to at third embodiment of the present invention in an inflated and deployed state, cross-sectioned in the width direction;
and
FIG. 10 is a sectional view showing a side airbag according to a fourth embodiment of the present invention, cross-sectioned in the same manner as in FIG. 5.

DETAILED DESCRIPTION OF THE INVENTION

Figure 1:
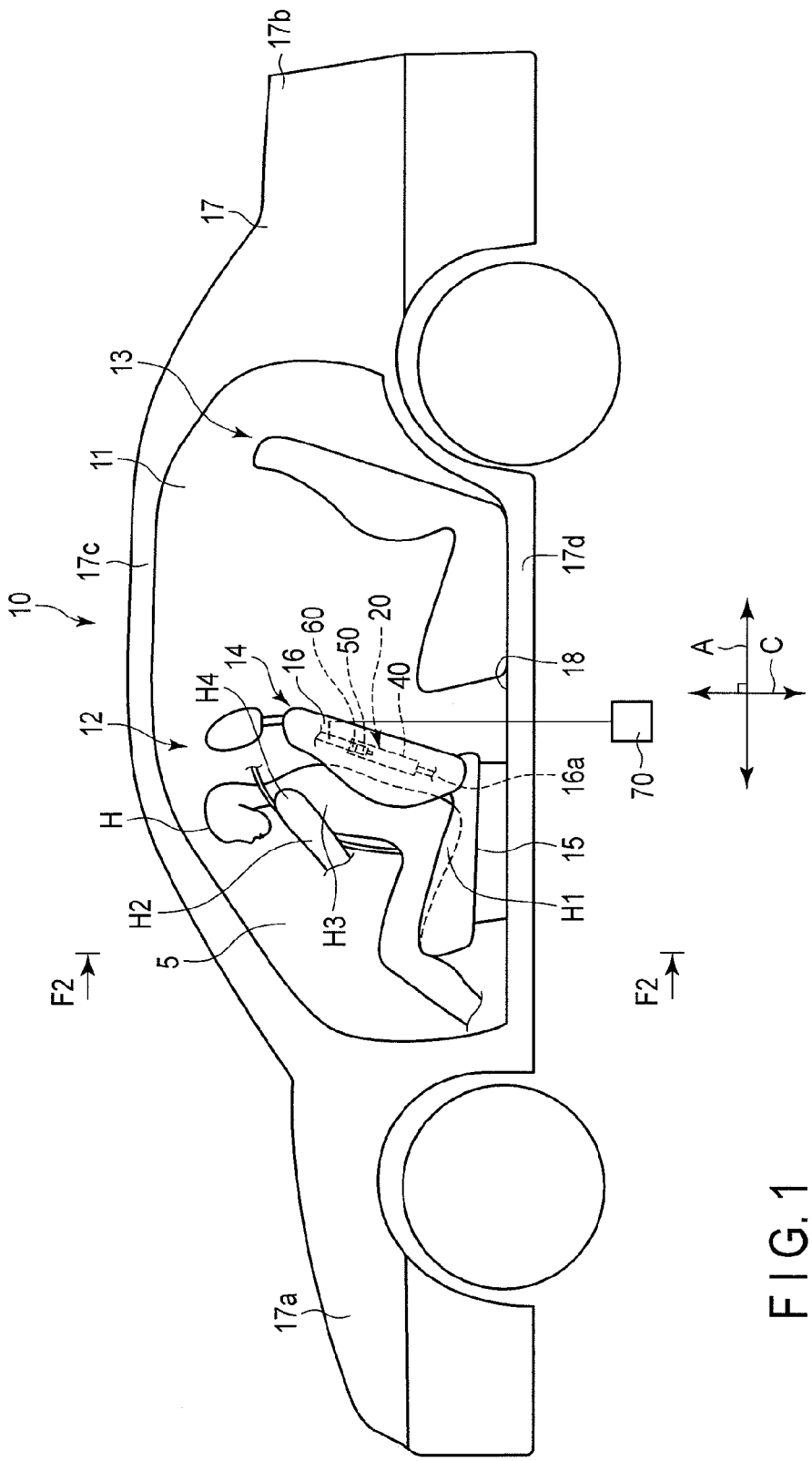
FIG. 1 is a schematic view showing the interior of an automobile furnished with a side airbag according to a first embodiment of the present invention.

A side airbag according to a first embodiment of the present invention will be described with reference to FIGS. 1 to 6. FIG. 1 is a side view schematically showing an automobile 10 furnished with a side airbag device 20. The side airbag device 20 comprises a aide airbag 30 as an example of the present invention. The automobile 10 is an example of a vehicle furnished with the side airbag device 20.

FIG. 1 shows a vehicle interior 11 of the automobile 10. Front seats 12 and a rear seat 13 are disposed in the vehicle interior 11. The front seats 12 comprise a driver's seat (not shown) and passenger seat 14. FIG. 1 shows the a passenger seat 14.

The passenger seat 14 comprises a seat cushion 15, a seatback 16, and the side airbag device 20. The seat cushion 15 is supported on a floor panel 18 by a slide mechanism (not shown) for sliding motion in a vehicle-body longitudinal direction A. The seatback 16 is located behind the seat cushion 15. The seatback 16 comprises a framework member 16a (part of which is indicated by a dotted line in FIG. 1) and a cushion material that covers the framework member. The driver's seat is constructed in substantially the same manner as the passenger seat 14.

The following is a definition of the longitudinal, transverse, and vertical directions of a vehicle body 17. The direction in which the automobile 10 advances with its accelerator pedal depressed when a steering unit operated by the driver is in its initial position is parallel to the vehicle-body longitudinal direction A when the automobile 10 is placed on a flat surface perpendicular to the direction of the gravitational force and when the reverse gear is not engaged as a traveling gear of the automobile 10. The direction of the advance is defined as a forward direction along the vehicle-body longitudinal direction, and the opposite direction as a reverse direction along the vehicle-body longitudinal direction. A front-side part of the vehicle body 17 with respect to the vehicle-body longitudinal direction A is defined as a front portion 17a, and an opposite side of the vehicle body 17 as a rear portion 17b.

A steering wheel is an example of the steering unit. The initial position of the steering unit is a position where the steering unit is not operated by the driver. As for the steering wheel, the steering wheel is not rotating in this position.

The vehicle-body longitudinal direction A is perpendicular to a vehicle width direction B. The vehicle-body width direction is the vehicle width direction, and the left-right direction is defined with respect to the longitudinal direction A. A vehicle-body vertical direction C is a direction perpendicular to the vehicle-body longitudinal direction A and vehicle width direction B, and an upper portion 17c and lower portion 17d are arranged based on the longitudinal and width directions. Further, the vehicle-body vertical direction C is a direction parallel to the direction in which the gravitational force acts when the automobile 10 is placed on a flat surface perpendicular to the direction of the gravitational force. The direction of the gravitational force is defined as a downward direction, and the direction opposite to the direction of the gravitational force as an upward direction.

The side airbag device 20 provided at each of the driver seat (not shown) and passenger seat 14. The side airbag device 20 provided at the driver seat and the side airbag device 20 provided at the passenger seat 14 may be constructed in the same manner. Therefore, the side airbag device 20 provided at the passenger seat 14 will be representatively described below. The passenger seat 14 is an example of a seat according to the present invention.

First, the position of the passenger seat 14 in the vehicle interior 11 will be specifically described. FIG. 2 is a sectional view of the automobile 10 taken along line F2-F2 shown in FIG. 1 FIG. 2, in which the vicinity of the front seat 12 of the automobile 10 is cross-sectioned in the vehicle width direction B, shows the vicinity of the passenger seat 14. As shown in FIG. 1, the vehicle body 17 is formed with a door opening 5 outside the passenger seat 14 with respect to the vehicle width direction. The opening 5 is covered with the door member 6 in such a manner that it can be opened and shut. The passenger seat 14 is located inside a door member 6 with respect to the vehicle width direction. A door opening and a door member that closes this opening are disposed in the vicinity of the driver seat, which is constructed in the same manner as the vicinity of the passenger seat 14.

As shown in FIGS. 1 and 2, the side airbag device 20 is provided at the seatback 16. Specifically, the side airbag device 20 is disposed in that part of the framework member 16*a* of the seatback 16 which faces the door member 6. The side airbag device 20 comprises the side airbag 30, a case 40, an inflator 50, an igniter 60, an impact detection sensor 70, etc.

The case 40 is secured to the framework member 16*a*. The side airbag 30 is accommodated in the case 40. The side airbag 30 will be described in detail later. The inflator 50 can inject gas into the side airbag 30. The igniter 60 actuates the inflator 50. The impact detection sensor 70 detects impact applied to the automobile 10 and actuates the igniter 60 based on the impact. Although the impact detection sensor 70 is shown to be located outside the vehicle body 17 in FIG. 1, it is actually disposed somewhere within the vehicle body 17.

If gas is injected by the inflator 50, the side airbag 30 is inflated and deployed. Therefore, the case 40 is configured to be broken so that the side airbag 30 can be externally deployed when the side airbag 30 is inflated. A notch or the like is formed in that part of the seatback 16 which faces the door member 6 or a region near that part in order to allow the inflated and deployed side airbag 30 to be deployed outside the seat. The deployed side airbag 30 is deployed outside the seat through the notch.

Figure 3:
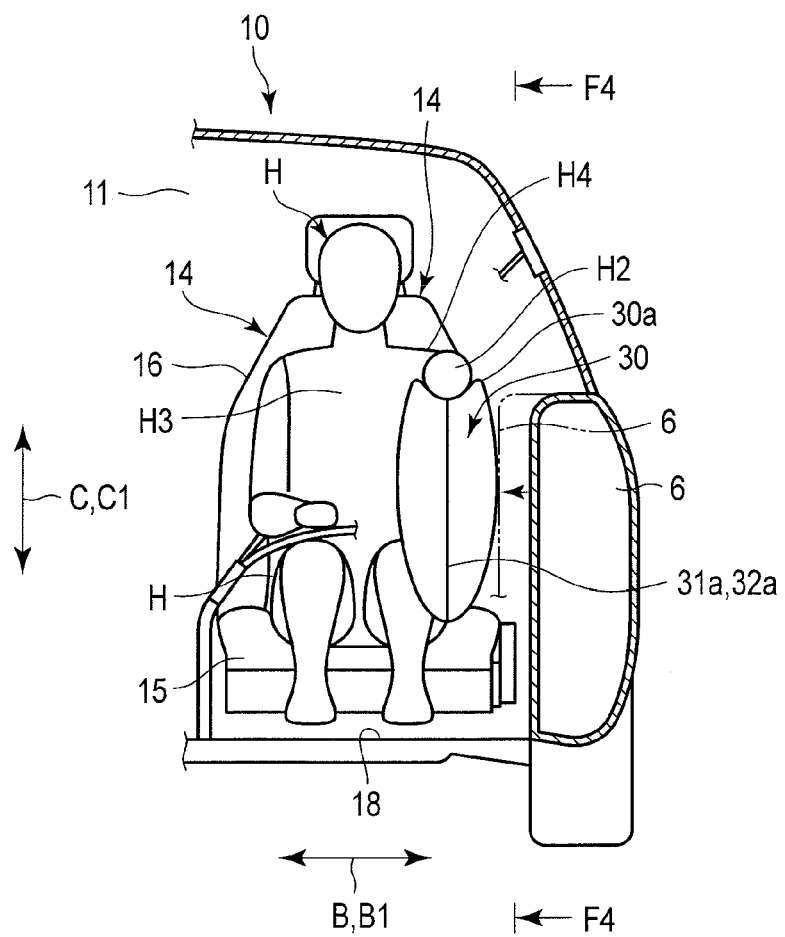
FIG. 3 is a schematic view of the side airbag of FIG. 2 in a deployed state taken from the front side of a vehicle body.
Figure 4:
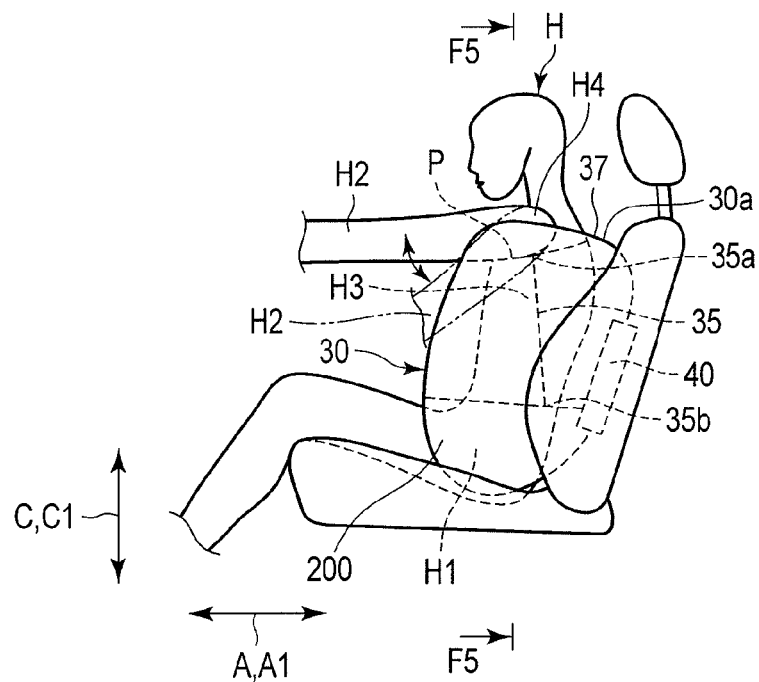
FIG. 4 is a sectional view of the vehicle body taken along line F4-F4 shown in FIG. 3.
Figure 5:
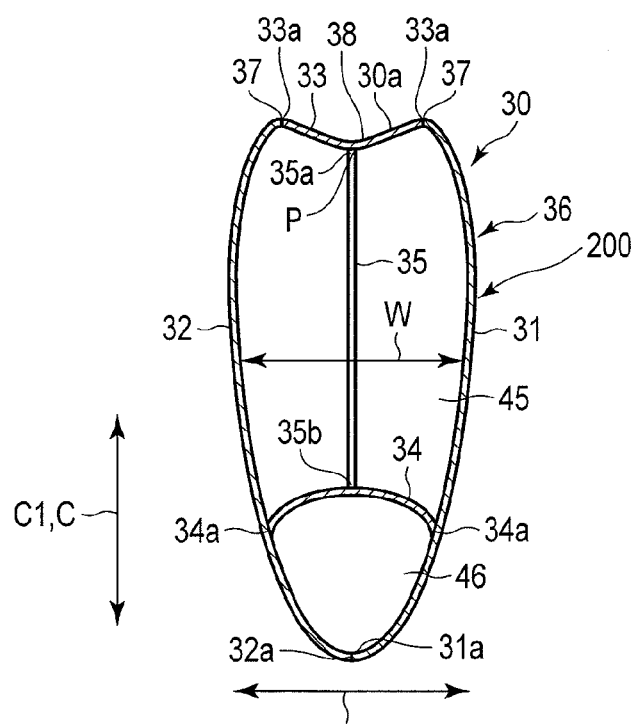
FIG. 5 is a sectional view showing the side airbag of FIG. 4 cross-sectioned along line F5-F5.

The side airbag 30 will be described specifically. FIG. 3 is a schematic view of the side airbag 30 in a deployed state taken from the front side of the vehicle body. FIG. 4 is a sectional view of the vehicle body 17 taken along line F4-F4 shown in FIG. 3. FIG. 4 shows the deployed state of the side airbag 30 cross-sectioned in the vehicle-body longitudinal direction A. FIG. 4 shows the vicinity of the passenger seat 14. FIG. 5 shows the deployed side airbag 30 cross-sectioned along line F5-F5 shown in FIG. 4. FIG. 5 illustrates only the side airbag 30 and illustrates neither the passenger seat 14 nor an occupant H seated in the passenger seat 14.

Here are defined a longitudinal direction A1, width direction B1, and vertical direction C1 of the side airbag 30. The various directions of the side airbag 30 are defined based on such an attitude that the side airbag 30 is inflated and deployed laterally relative to the seat.

The various directions of the side airbag 30 described above are coincident with directions set for the passenger seat 14 (seat to which the side airbag device 20 is attached). In the present embodiment, a longitudinal direction, width direction, and vertical direction set for the passenger seat 14 are coincident with the vehicle-body longitudinal direction A, vehicle width direction B, and vehicle-body vertical direction C, respectively, defined for the vehicle body 17. In the present embodiment, therefore, the longitudinal direction A1, width direction B1, and vertical direction C1 of the side airbag 30 are coincident with A, B and C, respectively. The directions A1, B1 and C1 are perpendicular to one another.

If the seatback 16 is constructed so that it can be longitudinally reclined relative to the seat cushion 15, the various directions of the side airbag 30 are set based on a state where the seatback 16 is not reclined. In FIGS. 2 to 4, the seatback 16 is not reclined.

As shown in FIG. 5, the side airbag 30 comprises a first base fabric 31 for use as a vehicle-body-side base fabric, second base fabric 32 as an occupant-side base fabric, third base fabric 33 as a top base fabric, partition cloth 34, and tether 35. The first and second base fabrics 31 and 32 are located opposite each other in the width direction B and have substantially the same shape and size. All areas of the first and second base fabrics 31 and 32 except the upper ends of their respective peripheral edges 31*a* and 32*a* are connected to one another. As an example of this connection structure, those areas are sewn together. The first and second base fabrics 31 and 32, thus sewn together, form a side airbag body 36. The side airbag body 36 is in the form of an open-top bag. The side airbag body 36 is in the form of an open-top bag.

The third base fabric 33 is disposed so as to close the top opening of the side airbag body 36. The whole area of a peripheral edge 33*a* of the third base fabric 33 is connected to the opening edge of the side airbag body 36. As an example of this connection structure, those edges are sewn together. In the drawing, reference number 37 denotes a seam (joint) along which the side airbag body 36 and third base fabric 33 are sewn together. As shown in FIG. 4, the seam 37 extends a predetermined length in the longitudinal direction A1. The predetermined length stated here is a sufficient length to enable an arm facing section 38 (described later) to support an arm H2.

The partition cloth 34 divides the interior of the side airbag 30 into an upper compartment 45 and a lower compartment 46. When the side airbag 30 is in the deployed state, the lower compartment 46 faces a lumbar region H1 of the occupant H. In the vicinity of a region that faces the lumbar region H1 when the side airbag 30 is in the deployed state, an entire peripheral edge 34*a* of the partition cloth 34 is sewn on the inner surfaces of the first and second base fabrics 31 and 32 throughout the circumference, whereby the interior of the side airbag 30 is divided into the upper and lower compartments 45 and 46.

The tether 35 is in the form of a cord, one end 35*a* of which is secured to the center of the third base fabric 33 with respect to the longitudinal direction A1 as well as to the width direction B1. For this fixing, the one end 35*a* and third base fabric 33 are sewn together, for example. The other end 35*b* of the tether 35 is secured to the center of the partition cloth 34 with respect to the width direction B1 in a position behind the one end 35*a* with respect to the longitudinal direction A1. As an example of this fixing structure, the other end 35*b* and partition cloth 34 are sewn together. The length of the tether 35 is set so that the tether 35 pulls down the center of the third base fabric 33 with respect to its width direction to cause the third base fabric 33 to be dented downward, as shown in FIG. 5, when the side airbag 30 is inflated and deployed. As the other end 35*b* of the tether 35 is secured to the partition cloth 34, moreover, the length of the tether 35 can be reduced so that the arm facing section 38 (described later) can be formed earlier. The tether is an example of a cord member according to the present invention.

The following is a more specific description of the position and size of the side airbag 30 and the position of the one end 35*a* of the tether 35. In the present embodiment, the occupant H is assumed to have the physique of the average Japanese adult, by way of example.

The side airbag 30, which is inflated and deployed, as shown in FIG. 3, is located outside the passenger seat 14 with respect to the vehicle width direction. When the occupant H is seated in the passenger seat 14, the side airbag 30 is disposed just beside the occupant H in a space between the occupant H and door member 6 (vehicle body 11). Further, the inflated and deployed side airbag 30 projects outward from that part of the seatback 16 which faces the arm H2 of the occupant H.

When the side airbag 30 is fully deployed, the side airbag 30 pushes up the arm H2 of the occupant H from below, and the third base fabric 33 that constitutes a top portion faces the arm H2 from below. A top portion 30a of the side airbag 30, which is formed of the third base fabric 33, forms the arm facing section 38. The arm facing section 38 is an example of an arm facing section according to the present invention. The third base fabric 33 is an example of a base fabric that forms the arm facing section according to the present invention.

The one end 35a of the tether 35 is connected to that part of the third base fabric 33 which faces the center of the arm H2 with respect to its width direction. The width direction of the arm H2 is a direction of the arm H2 parallel to the width direction B1 of the side airbag device 20. In the present embodiment, the position of the center of the third base fabric 33 with respect to its width direction faces the center of the arm H2 with respect to its width direction. Thus, the one end 35a of the tether 35 is connected to the center of the third base fabric 33 with respect to the width direction B1.

As shown in FIG. 4, the inflated and deployed side airbag 30 has a size that covers the lumbar region H1 and the entire area of a chest region H3 of the occupant H. Further, the inflated and deployed side airbag 30 has such a size that the arm H2 that is pushed up by the dented arm facing section 38 is parallel or substantially parallel to the longitudinal direction A1, as shown in FIG. 4. Although the arm H2 is set to be parallel or substantially parallel to the longitudinal direction in the present embodiment, it is not limited to this. The size of the side airbag 30 should only be such that the arm H2 is not located between the chest region H3 and side airbag 30 when the side airbag is inflated and deployed. Thus, the arm H2 may be pushed up above a position where it is parallel to the longitudinal direction. This is an example of a position where the arm does not overlap a chest region according to the present invention.

When the side airbag 30 is inflated and deployed, the seam 37 between the side airbag body 36 and third base fabric 33 is urged to project outward, and the center of the third base fabric 33 is pulled by the tether 35, so that the arm facing section 38 is dented. The position of the bottom of the hollow is designated by P. In the present embodiment, P is in the center of the third base fabric with respect to the width direction B1. In FIG. 4, the bottom position P is indicated by a dotted line. The bottom position P extends in the longitudinal direction A1.

Since the seam 37 and position P extend in the longitudinal direction A1, as shown in FIG. 4, the dent shape of the arm facing section 38 is kept in the longitudinal direction A1. The arm H2 of the occupant H is accommodated in this dent. The width of the third base fabric 33 is set so that the arm H2 can be accommodated. Since the other end 35b is located behind the one end 35a, the dent of the arm facing section 38 is formed mainly on the front side. This is because the arm H2 is located ahead of a shoulder H4. In other words, the positions of the ends 35a and 35b are set so that the dent shape is formed ahead of the Shoulder H4 of the occupant H at the least.

Since the third base fabric 33 is disposed at the top portion 30a, moreover, the inflated and deployed side airbag 30 has a width W that increases from bottom to top. Specifically, the width of that part of the side airbag 30 which faces the chest region H3 can be made larger, so that allowance for the absorption of impact applied to the chest region H3 can be made generous. The width W is set to be larger by virtue of the absence of the arm H2.

The following is a description of the operation of the side airbag device 20. If impact is applied laterally to the automobile 10, the impact detection sensor 70 detects this impact. In the present embodiment, the impact detection sensor 70 is set such that it can detect, for example, impact of a preset magnitude or greater. If the impact detection sensor 70 detects impact, the igniter 60 is actuated. When the igniter 60 is actuated, the inflator 50 discharges gas. Consequently, the side airbag 30 is inflated and deployed.

Figure 6:
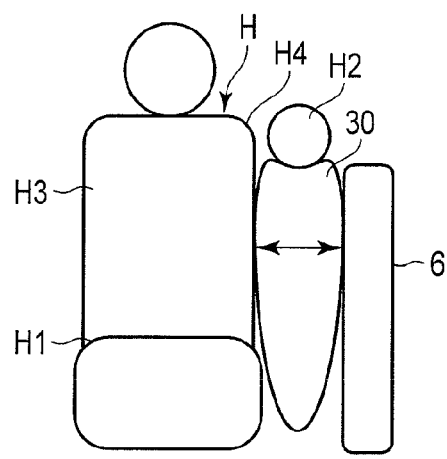
FIG. 6 is a diagram more schematically showing a state where the side airbag is inflated and deployed.

As the side airbag 30 is inflated and deployed, the arm facing section 38 of the side airbag 30 pushes up the arm H2 of the occupant H. When this is done, the side airbag 30 pushes up the arm H2 to a position where the arm H2 does not overlap the chest region H3 of the occupant H. In FIG. 4, the arm H2 that is not yet pushed up is indicated by a two-dot chain line. FIG. 6 is a diagram more schematically showing a state where the side airbag 30 is inflated and deployed. FIG. 6 shows an example in which the passenger seat is viewed from the front. As shown in FIG. 6, the inflated and deployed side airbag 30 is located beside the chest region H3 of the occupant H. Since the side airbag 30 pushes up the arm H2, the arm H2 is not accommodated between the chest region H3 and side airbag 30. FIG. 6 shows a state after the door member 6 is moved so that it strikes the side airbag 30.

If the door member 6 is caused to project inward relative to the vehicle width by lateral impact, as shown in FIG. 3, the impact is absorbed by the side airbag 30.

In the side airbag device 20 constructed in this manner, the side airbag 30 pushes up the arm H2 of the occupant H so that the arm H2 is not accommodated between the chest region H3 and side airbag 30. Consequently, the width W of the side airbag 30, which is allowance for the absorption of impact, can be fully secured, so that the impact applied to the occupant H can be further reduced. Since the arm H2 is pushed up, moreover, the arm H2 cannot be pressed against the chest region H3, so that the impact cannot be applied to the chest region H3 through the arm H2.

Since the arm facing section 38 is dented, furthermore, the arm H2 is accommodated into the dent in the process of inflation and deployment, so that the arm H2 can be smoothly pushed up without being disengaged from the side airbag 30.

In connection with the present embodiment, the side airbag device 20 has been described as being provided at the passenger seat 14, for example. However, the side airbag device 20 may alternatively be used for the driver seat or rear seat 13. Also in this case, the same effect as that of the present embodiment can be obtained.

A side airbag according to a second embodiment of the present invention will now be described with reference to FIGS. 7 and 8. Like reference numbers used in the first embodiment are used to designate configurations having the same functions as those of the first embodiment, and a description thereof is omitted. The present embodiment differs from the first embodiment in the structure of a side airbag 30. Other structures are the same as those of the first embodiment. The following is a specific description of the different structure. The structures of a side airbag device 20 of the present embodiment other than the side airbag 30 are the same as those of the first embodiment.

Figure 7:
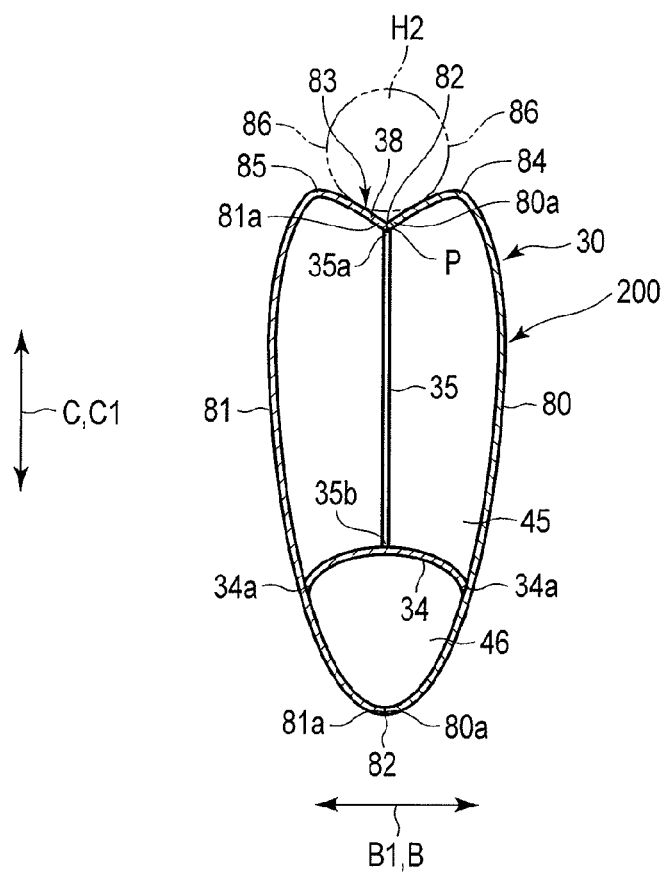
FIG. 7 is a sectional view showing a side airbag according to a second embodiment of the present invention in an inflated and deployed state, cross-sectioned in a width direction.

FIG. 7 is a sectional view showing the side airbag 30 of the present embodiment in an inflated and deployed state, cross-sectioned in the width direction 31. In the present embodiment, as shown in FIG. 7, the side airbag 30 comprises fourth and fifth base fabrics 80 and 81 in place of the first to third base fabrics 31 to 33. The fourth and fifth base fabrics 80 and 81 are located opposite each other in the width direction 31, and their respective peripheral edges 80a and 81a are entirely connected to each other. As an example of the mutual connection structure, those edges are sewn together. The fourth and fifth base fabrics 80 and 81 are an example of two base fabrics according to the present invention.

In the present embodiment, a joint that is formed by connecting the peripheral edges 80a and 81a of the fourth and fifth base fabrics 80 and 81 is located, for example, on an imaginary plane that is defined by the longitudinal direction A1 and vertical direction C1. In other words, a seam that connects the fourth and fifth base fabrics 80 and 81 is located on the imaginary plane defined by the longitudinal direction. A1 and vertical direction C1.

FIG. 8 is a side view showing the side airbag 30 of the present embodiment in the inflated and deployed state, taken from the outside with respect to the width direction B1. As shown in FIG. 8, a seam 82 as a joint along which the respective upper edges of the fourth and fifth base fabrics 80 and 81 are sewn together is designed to extend in the longitudinal direction A1 and face the center of the arm H2 when the side airbag 30 is inflated and deployed. The seam 82, like that of the first embodiment, is long enough to support the arm H2.

One end 35a of a tether 35 is connected to the seam 82. As an example of the connection structure, the one end 35a and seam 82 are sewn together. A partition cloth 34 is connected to those parts of the fourth and fifth base fabrics 80 and 81 near the lumbar region H1 of the occupant H so as to divide a lower compartment 46 and upper compartment 45 in the inflated and deployed state. The connection structure and position of the partition cloth 34 are the same as those of the first embodiment. The other end 35b of the tether 34, like that of the first embodiment, is connected to the partition cloth 34. The positional relationship between the one end 35a and the other end 35b is the same as that of the first embodiment. Specifically, the other end 35b is located behind the one end 35a. Thus, as in the first embodiment, a dent of an arm facing section 38 is formed mainly on the front side. The one end 35a and the other end 35b are set so that the dent shape of the arm facing section 38 is formed ahead of the shoulder H4 of the occupant H at the least.

When the side airbag 30 is inflated and deployed, as shown in FIG. 7, a top portion 83 of the fourth and fifth base fabrics 80 and 81 forms the arm facing section 38. The length of the tether 35 is set so that the arm facing section 38 is dented.

Seams 84 and 85 that extend in the longitudinal direction A1 are formed near the seam 82 on the top of fourth and fifth base fabrics 80 and 81. The seams 84 and 85 stated here do not connect different base fabrics but sew threads on them.

When the side airbag 30 is inflated and deployed, the seams 84 and 85 face an outer edge 86 of the arm H2 of the occupant H with respect to the width direction B1 (B). In other words, the seams 84 and 85 are set so as to face the outer edge 86. The seams 84 and 85 are an example of bending portions that are formed so that the fourth and fifth base fabrics 80 and 81 are turned back when the side airbag 30 is inflated, and deployed.

When the side airbag 30 is inflated and deployed, that part of the seam 82 to which the tether 35 is connected is pulled, and the fourth and fifth base fabrics 80 and 81 are turned back at the seams 84 and 85, whereby the top portion is dented. Since a bottom position P and the seams 84 and 85 extend in the longitudinal direction A1, the dent shape of the arm facing section 38 is maintained in the longitudinal direction A1, as in the first embodiment shown in FIG. 1.

The seams 84 and 85 are an example of the bending portions. Alternatively, they may be formed so that their outside parts are turned back in positions where the fourth and fifth base fabrics 80 and 81 face the outer edge of the arm, or near positions opposite the outer edges of the arm, or near positions opposite the outer edges of the arm. Based on this structure, as in the first embodiment, the arm H2 can be accommodated at the arm facing section 38.

The size and shape of the inflated and deployed side airbag 30 are the same as those of the side airbag 30 that are constructed using the first to third base fabrics 31 and 33 of the first embodiment. The side airbag device 20 is constructed in the same manner as the first embodiment except for the side airbag 30 described above. The side airbag 30 is deployed in the same manner as in the first embodiment. The deployed side airbag 30 of the present embodiment, like that of the first embodiment, pushes up the arm H2 of the occupant H to an up position where it does not overlap the chest region H3 in the width direction B1.

Also in the present embodiment, the same operation and effect as in the first embodiment can be obtained.

A side airbag according to a third embodiment of the present invention will now be described with reference to FIG. 9. Like reference numbers used in the first embodiment are used to designate configurations having the same functions as those of the first embodiment, and a description thereof is omitted. The present embodiment differs from the first embodiment in the structure of a side airbag 30. Other structures are the same as those of the first embodiment. The following is a specific description of the different structure. The structures of a side airbag device 20 of the present embodiment other than the side airbag 30 are the same as those of the first embodiment.

FIG. 9 is a sectional view showing the side airbag 30 of the present embodiment in an inflated and deployed state, cross-sectioned in the width direction B1. As shown in FIG. 8, the side airbag 30 comprises sixth to ninth base fabrics 90, 91, 92 and 93, in place of the first to third base fabrics 31 to 33, and tether 35.

The sixth and seventh base fabrics 90 and 91 are located opposite each other in the width direction B1. The respective front and rear edges of the sixth and seventh are connected to one another. As an example of the connection structure, those edges are sewn together. The entire peripheral edge of the eighth base fabric 92 is connected to upper edges 90a and 91a of the sixth and seventh base fabrics 90 and 91. As an example of the connection structure, those edges are sewn together. The entire peripheral edge of the ninth base fabric 93 is connected to lower edges 90b and 91b of the sixth and seventh base fabrics 90 and 91. As an example of the connection structure, those edges are sewn together.

A seam 100 between the sixth and eighth base fabrics 90 and 92 extends in the longitudinal direction A1. A seam 101 between the seventh and eighth base fabrics 90 and 92 extends in the longitudinal direction A1. The seams 100 and 101 are long enough to support the arm H2.

The side airbag 30 is formed as a bag as the sixth to ninth base fabrics 90 to 93 are sewn together in the above-described manner. The eighth base fabric 92 forms an arm facing section 38. One end 35a of the tether 35 is connected to that part (e.g., the center with respect to the width direction B1 of the arm according to the present embodiment) of the eighth base fabric 92 which faces the center of the arm H2 of the occupant H. The other end 35b of the tether 35 is connected to the ninth base fabric 93. The length of the tether 35 is set so that the arm facing section 38 is dented so as to accommodate the arm H2 when the side airbag 30 is inflated and deployed. A bottom position P extends in the longitudinal direction A1. The eighth base fabric 92 is large enough to accommodate the arm H2.

When the side airbag 30 is inflated and deployed, it is pulled by the tether 35, and the seams 100 and 101 between the ninth base fabric 93 and the sixth and seventh base fabrics 90 and 91 project outward, so that the arm facing section 38, like that of the first embodiment, is dented. The dent shape is maintained in the longitudinal direction A1.

In the present embodiment, the interior of the side airbag 30 is not divided into upper and lower compartments 45 and 46. Further, lower edges 90b and 91b of the sixth and seventh base fabrics 90 and 91 and the ninth base fabric 93 are connected. When the side airbag 30 is inflated and deployed, therefore, a width w of that part of it which faces the lumbar region H1 of the occupant H can be fully secured. In other words, allowance for the absorption of impact applied to the lumbar region H1 can be made generous.

The side airbag device 20 is constructed in the same manner as the first embodiment except for the side airbag 30 described above. The side airbag 30 is deployed in the same manner as in the first embodiment. The deployed side airbag 30 of the present embodiment, like that of the first embodiment, pushes up the arm H2 of the occupant H to an up position where it does not overlap the chest region H3 in the width direction B1.

Further, the longitudinal positional relationship between the one end 35a and the other end 35b of the tether 35 is the same as that of the first embodiment. Specifically, the other end 35b is located behind the one end 35a. Thus, as in the first embodiment, a dent of the arm facing section 38 is formed mainly on the front side. The one end 35a and the other end 35b are set so that the dent shape of the arm facing section 38 is formed ahead of the shoulder H4 of the occupant H at the least.

In the present embodiment, impact applied to the lumbar region H1 of the occupant H can be further absorbed, in addition to the same effect as that of the first embodiment.

A side airbag according to a fourth embodiment of the present invention will now be described with reference to FIG. 10. Like reference numbers used in the second embodiment are used to designate configurations having the same functions as those of the second embodiment, and a description thereof is omitted. The present embodiment differs from the second embodiment in the structure of a side airbag 30. The structures of a side airbag device 20 other than the side airbag 30 are the same as those of the second embodiment. The following is a specific description of the different structure.

The side airbag 30 of the present embodiment differs from the side airbag 30 described in connection with the second embodiment in that it does not comprise a partition cloth 34 and in the region to which the other end 35b of a tether 35 is secured. The structures of the side airbag 30 of the present embodiment other than the above-described structures are the same as those of the side airbag 30 of the second embodiment.

FIG. 10 shows the side airbag 30 of the present embodiment, cross-sectioned in the same manner as in FIG. 5 showing the first embodiment. As shown in FIG. 10, the side airbag 30 of the present embodiment does not comprise the partition cloth 34. One end 35a of the tether 35, like that of the second embodiment, is connected to a seam 82 along which the respective upper ends of peripheral edges 80a and 81 of fourth and fifth base fabrics 80 and 81 are connected to each other. As an example of this connection structure, those edges are sewn together.

As shown in FIG. 10, the other end 35b of the tether 35 is connected to a seam 82a along which the respective lower ends of the peripheral edges 80a and 81a of the fourth and fifth base fabrics 80 and 81 are sewn together at the seam as the joint that connect the peripheral edges 80a and 81a. In other words, the other end 35b is connected to both the fourth and fifth base fabrics 80 and 81. As an example of this connection structure, those edges are sewn together.

Also in the present embodiment, the positional relationship between the one end 35a and the other end 35b in the longitudinal direction A1 is the same as in the first and second embodiments. Specifically, the other end 35b is located behind the one end 35a. Thus, as in the first embodiment, a dent of an arm facing section 38 is formed mainly on the front side. The one end 35a and the other end 35b are set so that the dent shape of the arm facing section 38 is formed ahead of the shoulder H4 of the occupant H at the least.

The deployed side airbag 30 of the present embodiment, like that of the first embodiment, pushes up the arm H2 of the occupant H to an up position where it does not overlap the chest region H3 in the width direction B1.

In the present embodiment, moreover, the other end 35b of the tether 35 is connected to the seam 82a as a joint between the fourth and fifth base fabrics 80 and 81, whereby it is connected to both the fourth and fifth base fabrics 80 and 81. However, this is not limitative. The other end 35b may be secured to the fourth base fabric 80 only. In this case, the other end 35b should only be secured to that part of the fourth base fabric 80 which is located below the one end 35a. Alternatively, the other end 35b may be connected to the fifth base fabric 81 only. In this case, the other end 35b should only be secured to that part of the fifth base fabric 81 which is located below the one end 35a. As in the second embodiment shown in FIG. 7, moreover, the other end 35b may be connected to both the fourth and fifth base fabrics 80 and 81 by the partition cloth 34.

Thus, the other end 35b should only be connected to the fourth base fabric 80, as an example of the vehicle-body-side base fabric according to the present invention, and/or a fifth base fabric 81, as an example of the occupant-side base fabric according to the present invention. Even in the case that the other end 35b is secured to at least one of the fourth and fifth base fabrics 80 and 81, the one end 35a and the other end 35b should preferably be set so that the dent shape of the arm facing section 38 is formed ahead of the shoulder H4 of the occupant H at the least.

In the first to fourth embodiments, the occupant H is assumed to have the physique of the average Japanese adult. The side airbag 30 is formed adaptively to the occupant H. However, the occupant H is not bound to be formed adaptively to the physique of the average Japanese adult. The side airbag 30 may be shaped to fit the body of an occupant of a country where an apparatus (vehicle or automobile) mounted with the side airbag device 20 is used. Also in this case, the deployed side airbag 30 pushes up the arm H2 of the occupant H to a position where it does not overlap the chest region H3 in the width direction B1.

In the first and second embodiments, moreover, the single partition cloth 34 is used to divide the interior of the side airbag 30 into two parts, an upper compartment 45 and lower compartment 46. However, this is not limitative. The partition cloth should only be able to divide the interior of the side airbag 30 into at least upper and lower compartments. In other words, the partition cloth may be designed to divide the interior of the side airbag into, for example, the upper and lower compartments and one or more additional compartments. In this case, the interior of the side airbag 30 is divided into the upper compartment 45, lower compartment 46, and one or more additional compartments. Also in this structure in which the interior of the side airbag 30 is divided into three or more compartments, the other end 35b of the tether 35 should only be secured to the partition cloth. Alternatively, a plurality of partition cloths may be used to divide the interior of the side airbag 30 into three or more compartments as described above. In this case, the other end 35b of the tether 35 is secured to at least one of the plurality of partition cloths.

Also in the above-described structure in which the interior of the side airbag 30 is divided into three or more compartments, the positional relationship between the one end 35a and the other end 35 of the tether 35 in the longitudinal direction A1 is the same as in the first and second embodiments, so that the same effect as those of the first and second embodiments can be obtained.

In the first to fourth embodiments, moreover, the side airbag device 20 is provided at the passenger seat, by way of example. However, this is not limitative. The side airbag device 20 may be provided at the vehicle body 17. For example, the side airbag devices 20 described in connection with the first to fourth embodiments may be provided at the door member 6.

Also in the case that the side airbag device 20 is provided at the vehicle body 17, the position and attitude of the deployed side airbag 30 relative to the seat are the same as in the first to fourth embodiments. In this case, the longitudinal, vertical, and width directions of the side airbag 30 are coincident with the longitudinal, transverse, and vertical directions, respectively, of the seat that faces the deployed side airbag 30.

In the case that the side airbags 30 described in connection with the first to fourth embodiments are provided at the vehicle body 17, e.g., the door member 6, the longitudinal, vertical, and width directions of the side airbag 30 are coincident with the longitudinal, transverse, and vertical directions, respectively, of the passenger seat 14, that is, the vehicle-body longitudinal direction, vehicle width direction, and vehicle-body vertical direction, respectively.

In the first embodiment, moreover, the airbag body 36 and third base fabric 33 form an airbag unit 200. Thus, in the first embodiment, the side airbag 30 is configured to comprise the airbag unit 200, tether 35, and partition cloth 34. In the fourth embodiment, the side airbag 30 comprises an airbag unit 200 and the tether 35.

In the second and fourth embodiments, the fourth and fifth base fabrics 80 and 81 form an airbag unit 200. Thus, in the second embodiment, the side airbag 30 comprises the airbag unit 200, partition cloth 34, and tether 35.

In the third embodiment, the six, seventh, eighth, and ninth base fabrics 90 to 93 form an airbag unit 200. Thus, in the third embodiment, the side airbag 30 comprises the airbag unit and tether 35.

The airbag unit 200 described above defines the outline of the side airbag 30. The side airbag 30 is deployed as gas is injected into the airbag unit 200.

The airbag and the airbag unit are equivalent in the case that the side airbag 30 comprises neither the tether 35 nor the partition cloth 34 and is formed only of a member such as a base fabric that defines the outline of the side airbag 30.

This invention is not limited directly to the embodiments described above, and in carrying out the invention, its constituent elements may be embodied in modified forms without departing from the spirit of the invention. Further, various inventions may be made by suitably combining a plurality of constituent elements disclosed in the foregoing embodiments. For example, some constituent elements may be deleted from all the constituent elements shown in the foregoing embodiments. Furthermore, constituent elements according to different embodiments may be appropriately combined.

EXPLANATION OF REFERENCE NUMBERS

14: Passenger seat (seat)
20: Side airbag device
30: Side airbag
31: First base fabric (vehicle-body-side base fabric)
32: Second base fabric (occupant-side base fabric)
33: Third base fabric (upper base fabric)
34: Partition cloth
33: Third base fabric (base fabric)
35: Tether (cord member)
38: Arm facing section
45: Upper compartment
46: Lower compartment
50: Inflator
60: Igniter
80: Fourth base fabric (two base fabrics)
81: Fifth base fabric (two base fabrics)
H3: Chest region

The invention claimed is:

1. A side airbag configured to be deployed and inflated between a door of a vehicle and a vehicle occupant in a lateral direction of the vehicle, the side air bag comprising:
   an arm facing section, provided at an upper end of the side air bag, that rises upward as the side air bag inflates, the arm facing section having a dented shape extending in a longitudinal direction of the vehicle and configured to accommodate an arm of a vehicle occupant; and
   a tether extending between the arm facing section and a lower portion of the side air bag, the tether being a cord member, one end of which being connected to the arm facing section and an opposite end of which being connected to the lower portion of the side air bag at a position close to a rear of the side air bag in side view of the vehicle with respect to the one end.

2. The side airbag according to claim 1, wherein
   the arm facing section has such a shape as to be dented downward when the side airbag is deployed.

3. The side airbag device according to claim 1, wherein the side air bag further includes,
   a base fabric, which forms the arm facing section, and
   the cord member pulls the base fabric inward, thereby bringing the base fabric into the dented shape, in the inflated state.

4. The side airbag according to claim 3, wherein
   the one end of the cord member is secured to the base fabric and the opposite end of the cord member is secured to an inside of the side airbag on a side opposite to the base fabric.

5. The side airbag according to claim 4, further comprising:
   a partition cloth which separates a space inside the airbag into at least an upper compartment and a lower compartment, wherein
   the cord member is secured to the inside of the airbag as the opposite end is secured to the partition cloth.

6. The side airbag according to claim 4, wherein
   the arm facing section is located around a joint which connects two base fabrics, the cord member being secured to the joint.

7. The side airbag according to claim 3, wherein
   the arm facing section is located around a joint which connects two base fabrics, the cord member being secured to the joint.

8. A side airbag configured to be deployed and inflated between a door of a vehicle and a vehicle occupant in a lateral direction of the vehicle, the side air bag comprising:
   an arm facing section, provided at an upper end of the side air bag, that rises upward as the side air bag inflates, the arm facing section having a dented shape extending in a longitudinal direction of the vehicle and configured to accommodate an arm of a vehicle occupant, the arm facing section being located around a joint which connects an occupant-side base fabric located on the occupant side and a vehicle-body-side base fabric located on the side of the lateral portion of the vehicle body; and a tether extending between the arm facing section and a lower portion of the side air bag, the tether being a cord member, one end of which being connected to the arm facing section and an opposite end of which being connected to the lower portion of the side air bag at a position close to a rear of the side air bag in side view of the vehicle with respect to the one end.

9. The side airbag according to claim 8, wherein the one end of the cord member is secured to the joint and the opposite end of the cord member is secured to at least one of the inside of the occupant-side base fabric and the inside of the vehicle-body-side base fabric.

* * * * *